United States Patent [19]
Menhennett et al.

[11] Patent Number: 5,555,176
[45] Date of Patent: Sep. 10, 1996

[54] APPARATUS AND METHOD FOR MAKING THREE-DIMENSIONAL ARTICLES USING BURSTS OF DROPLETS

[75] Inventors: Herbert E. Menhennett, Easley; Robert B. Brown, Duncan, both of S.C.

[73] Assignee: BPM Technology, Inc., Greenville, S.C.

[21] Appl. No.: 325,889

[22] Filed: Oct. 19, 1994

[51] Int. Cl.⁶ .................................................. G06F 19/00
[52] U.S. Cl. .................... 364/468.25; 395/118; 264/308
[58] Field of Search ............................ 364/468, 474.24, 364/473, 477, 474.08, 474.05, 474.37; 395/118–120; 264/22, 40.1, 241, 308, 309; 425/135; 164/46, 94

[56] References Cited

U.S. PATENT DOCUMENTS

| | | |
|---|---|---|
| 4,575,330 | 3/1986 | Hull . |
| 4,665,492 | 5/1987 | Masters .................................. 364/468 |
| 4,749,347 | 6/1988 | Valavaara ............................... 425/135 |
| 5,031,120 | 7/1991 | Pomerantz et al. . |
| 5,038,014 | 8/1991 | Pratt et al. . |
| 5,059,266 | 10/1991 | Yamane et al. . |
| 5,121,329 | 6/1992 | Crump ................................... 364/468 |
| 5,126,529 | 6/1992 | Weiss et al. . |
| 5,128,235 | 7/1992 | Vassiliou et al. . |
| 5,134,569 | 7/1992 | Masters .............................. 364/474.24 |
| 5,136,515 | 8/1992 | Helinski ................................ 364/468 |
| 5,140,937 | 8/1992 | Yamane et al. . |
| 5,141,680 | 8/1992 | Almquist et al. ......................... 264/22 |
| 5,149,548 | 9/1992 | Yamane et al. . |
| 5,192,559 | 3/1993 | Hull et al. . |
| 5,204,124 | 4/1993 | Secretan et al. . |
| 5,207,371 | 5/1993 | Prinz et al. . |
| 5,216,616 | 6/1993 | Masters .............................. 364/474.24 |
| 5,257,657 | 11/1993 | Gore ..................................... 264/308 |
| 5,260,009 | 11/1993 | Penn ..................................... 264/40.1 |
| 5,287,435 | 2/1994 | Cohen et al. .......................... 395/118 |
| 5,301,415 | 4/1994 | Prinz et al. . |
| 5,301,863 | 4/1994 | Prinz et al. . |
| 5,303,141 | 4/1994 | Batchelder et al. . |
| 5,340,433 | 8/1994 | Crump . |
| 5,402,351 | 3/1995 | Batchelder et al. ................. 364/468 |

FOREIGN PATENT DOCUMENTS

| | | |
|---|---|---|
| 0420614 | 4/1991 | European Pat. Off. . |
| 0606627 | 7/1994 | European Pat. Off. . |
| 92/08200 | 5/1992 | WIPO . |
| 92/18323 | 10/1992 | WIPO . |
| 95/05943 | 3/1995 | WIPO . |

*Primary Examiner*—Roy N. Envall, Jr.
*Assistant Examiner*—Steven R. Garland
*Attorney, Agent, or Firm*—Allen, Dyer, Doppelt, Franjola & Milbrath, P.A.

[57] ABSTRACT

An apparatus includes a processor for controlling a build material dispenser and a dispenser positioner to construct a three-dimensional article in successive layers based upon article defining data, and wherein the processor operates the dispenser to dispense a series of bursts of build material at a series of respective target positions as the dispenser is advanced along a predetermined path of travel. Each burst is defined by a plurality of droplets dispensed in relatively rapid succession so that the build material thereof combines at a respective target position. The build material dispenser is preferably a jet including a piezoelectric actuator for ejecting a droplet of build material responsive to a corresponding firing signal. Accordingly, the processor generates a predetermined number of firing signals for the piezoelectric actuator corresponding to a desired number of droplets in each burst. Method aspects of the invention are also disclosed.

60 Claims, 8 Drawing Sheets

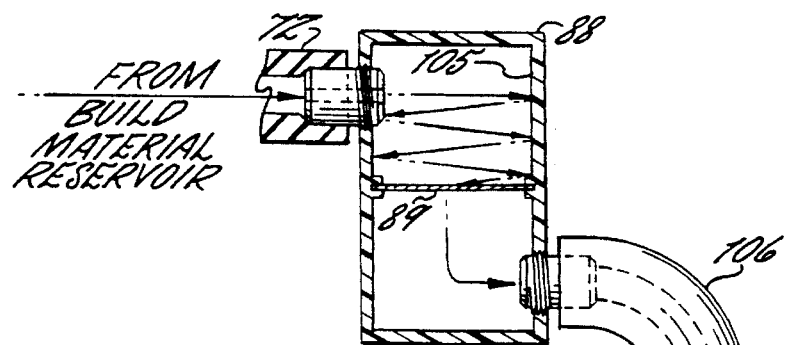
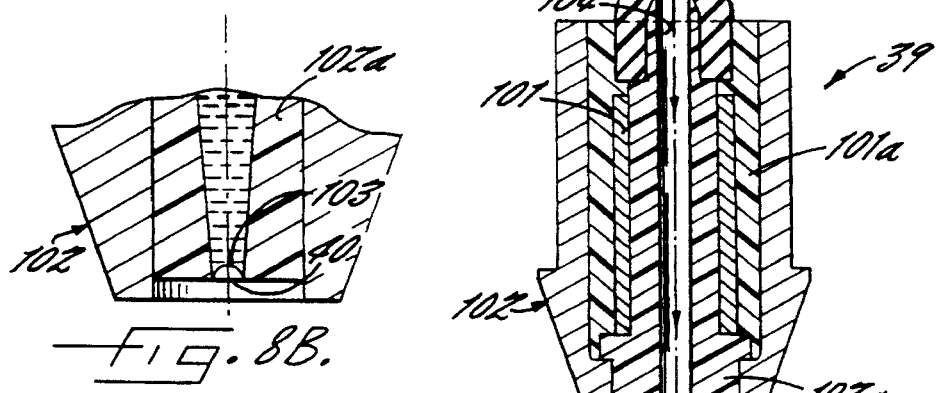
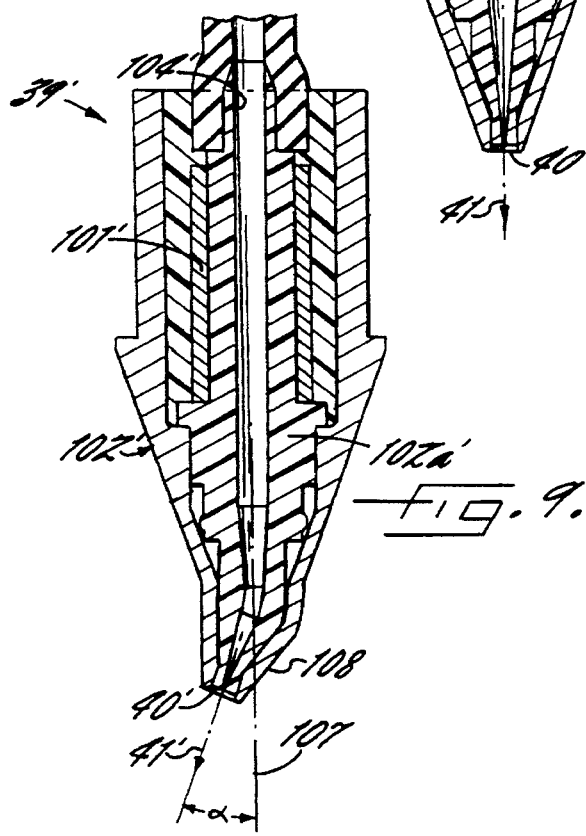

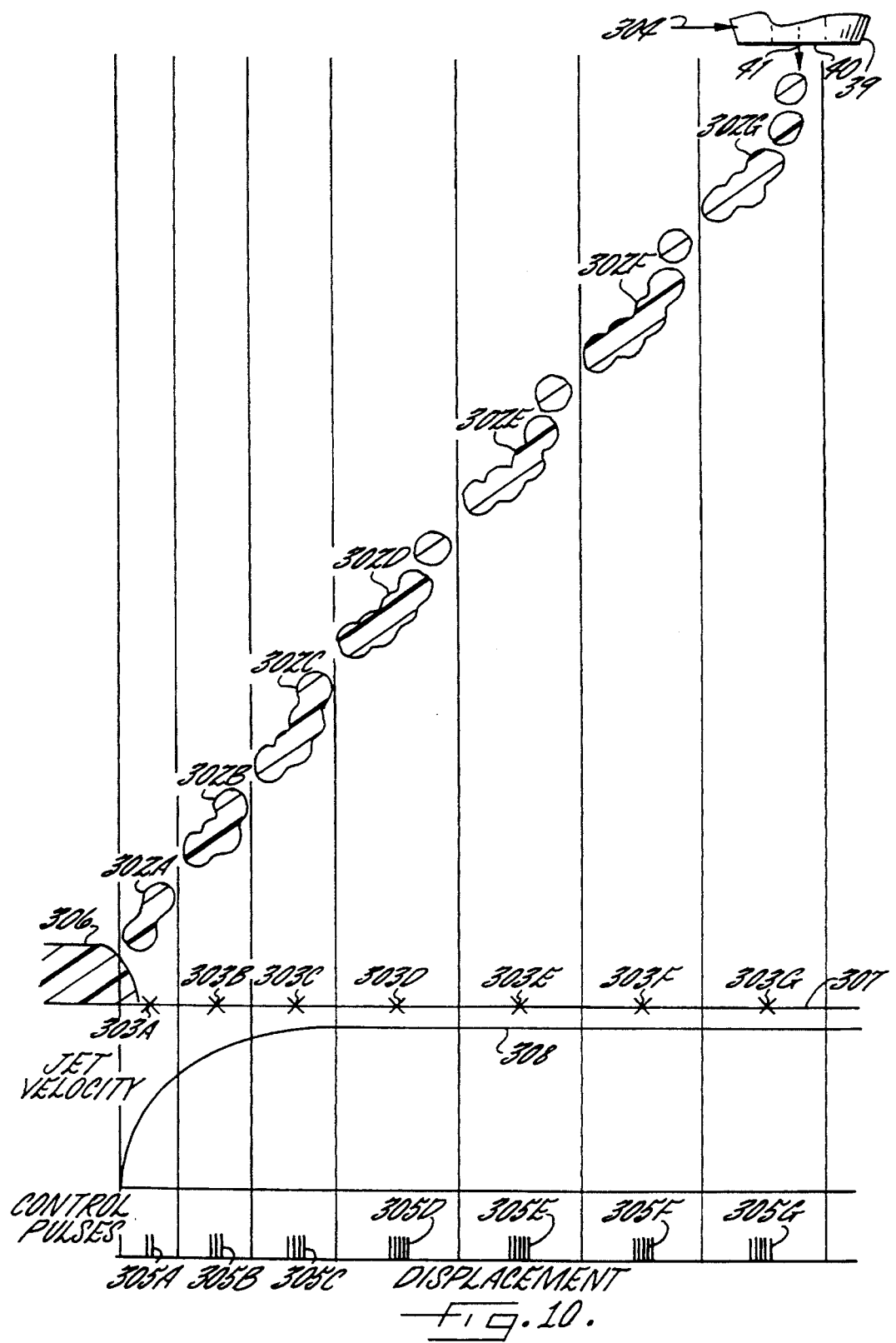

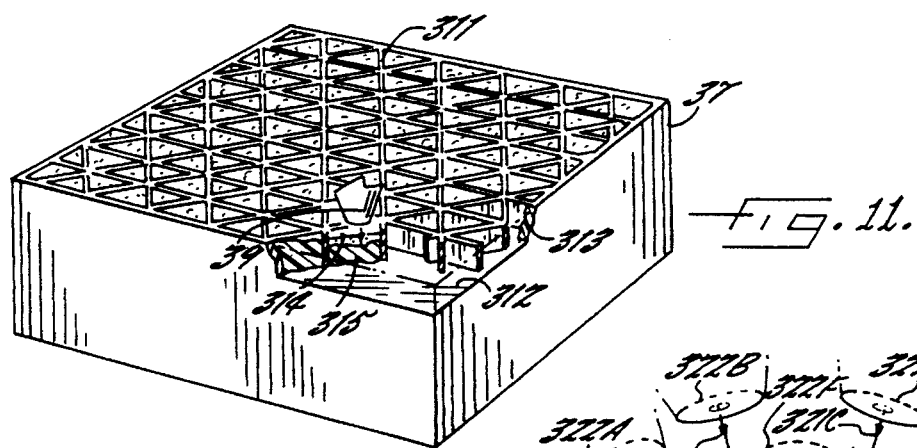
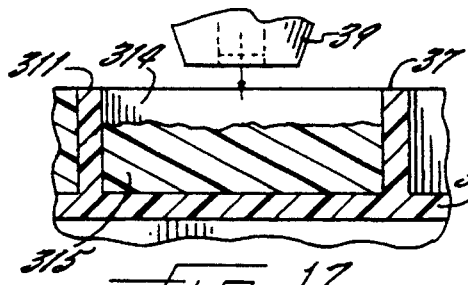
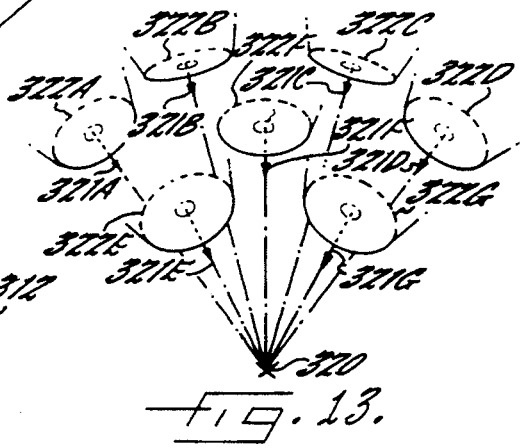
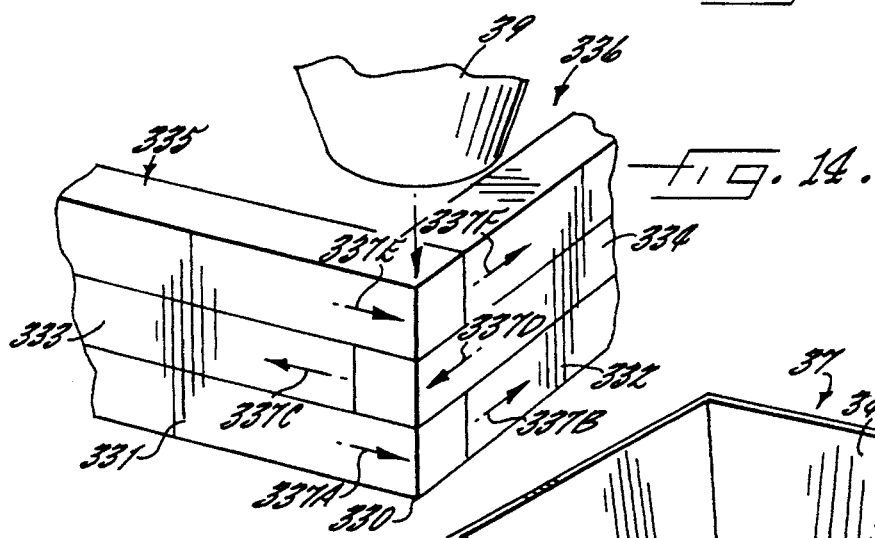
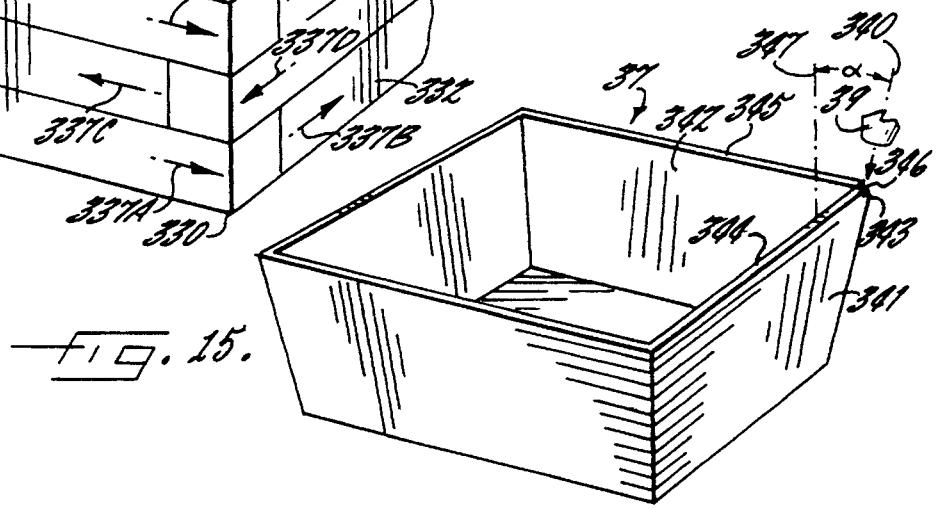

5,555,176

APPARATUS AND METHOD FOR MAKING THREE-DIMENSIONAL ARTICLES USING BURSTS OF DROPLETS

FIELD OF THE INVENTION

This invention relates to the field of making three-dimensional articles based upon article data, and more particularly, to an apparatus for ejecting droplets of build material to construct the article.

BACKGROUND OF THE INVENTION

In the manufacture of a three-dimensional article, it is common practice to first create a design of the article and then produce a prototype of the article. After reviewing the initial design and prototype, design revisions are often made requiring the production of yet another prototype. This process of review and redesign may be repeated a number of times before finding the desired design, thereby requiring that one or more prototypes be produced. Accordingly, the process of designing and prototyping an article may involve a considerable expense of time, effort and money.

Computer aided design (CAD) systems are commonly used for automating the design process. With the aid of a computer, an operator is able to design a three-dimensional article and display the design on a two-dimensional medium, such as a display screen or paper. The computer aids in the design as called for by the operator according to pre-existing design parameters and computer software.

Computer aided milling machines for milling articles in response to computer generated signals are also commonly used to make certain articles. In these machines, a computer generated data file representative of the article to be produced is used to control the operation of the machine. Milling tools within the machine shape a body of material. Relatively coarse tools may be used to shape coarse features, while relatively finer tools may be used to finish the article. These machines, however, are relatively large, expensive and limited in the article geometries that may be produced.

Accordingly, systems have been developed wherein a three-dimensional article is constructed in successive layers based upon three-dimensional CAD data. For example, stereolithography is one approach to producing a prototype of an article layer by layer. An example of the production of prototypes through stereolithography is disclosed in U.S. Pat. No. 4,575,330 to Hull entitled "Apparatus for Production of Three-Dimensional Objects By Stereolithography." Hull discloses an apparatus whereby articles are produced by forming successive, adjacent, cross-sectional laminae of the article at the surface of a fluid medium. The fluid medium is capable of altering its physical state from a fluid to a solid in response to stimulation, such as by UV radiation; particle bombardment such as electron beams; chemical reaction; or impinging radiation other than UV radiation. The apparatus includes a source of stimulation which may be selectively applied to the surface of the fluid medium to produce the cross-sectional laminae of the article. The source of selective stimulation is controlled by a computer in response to coordinate data.

Stereolithography, however, requires the use of more material than is actually incorporated in the article being produced, and also requires the exact placement of the article being constructed relative to the surface of the fluid medium. In addition, the depth of the layer created when the fluid surface is exposed to the stimulation may be difficult to control.

An apparatus and method for forming three-dimensional articles from a material which is normally solid but flowable when heated is disclosed in U.S. Pat. No. 5,141,680 to Almquist et al. entitled "Thermal Stereolithography." This patent discloses an apparatus including a nozzle for dispensing a material which has been heated to the point that it flows. The resolution of the final part is determined by the size of the outlet in the dispensing nozzle. The material is dispensed through the nozzle by applying pressure, and the flow of material can be stopped by means of a slidable valve or by lessening, ceasing, or reversing the pressure. Accordingly, precise control of the flow of material may be difficult and high accuracy of the article may be difficult to obtain.

U.S. Pat. No. 5,121,329 to Crump entitled "Apparatus and Method for Creating Three-Dimensional Objects" discloses another apparatus wherein a flow of material through a nozzle is used to create a three-dimensional object. The flow of material is determined by the size of the outlet orifice, a constant pressure, and the vertical height of the tip of the nozzle. In addition, a spring-loaded ball check valve may assist in metering the flow of material. Again, precise control of material flow may be difficult to obtain.

A major advance in the art of three-dimensional modeling is disclosed in U.S. Pat. No. 4,665,492 to Masters entitled "Computer Automated Manufacturing Process and System." This patent discloses an apparatus including: an ejection head having an ejection nozzle for emitting small mass particles of particulate matter; a servo-mechanism for manipulating the ejection head and nozzle; and a machine controller for controlling the servo-mechanism in response to a data file containing coordinate information representing the design of the article being produced. The mass particles are directed to the coordinates of a three-dimensional article as defined by the computer data file. The mass particles may include plastic material, a slurry material having water content, and charged particles which are electrically deflected.

A method and apparatus for forming three-dimensional solid form objects is disclosed in U.S. Pat. No. 5,257,657 to Gore entitled "Method for Producing A Solid-Phase Object From A Material in the Liquid Phase." According to this patent, droplets of a liquid-phase material are ejected to form a spheroid. The size of the droplet is usually preset and the ejection frequency is usually varied to change the mass of material delivered. This method, however, may not work well for glasses and plastics which do not have a set transition temperature at which they become rigid.

Another method and apparatus for forming three-dimensional objects is disclosed in U.S. Pat. No. 5,136,515 to Helinski entitled "Method and Means for Constructing Three-Dimensional Articles by Particle Deposition." This patent discloses a device including two jetting heads, or alternately a single jetting head with two feeder lines. In either embodiment, the controller causes fabrication particle material to be ejected as droplets forming the three-dimensional object, while a complementary support structure is created by the ejection of support particles. While this scheme allows the fabrication of layers having various angles of contact, the three-dimensional object must later be separated from the support structure.

U.S. Pat. No. 5,260,009 to Penn entitled "System, Method, and Process for Making Three-Dimensional Objects" discloses another apparatus for forming three-dimensional objects wherein a second material is dispensed with each layer of the three-dimensional article as it is formed. In this patent, the ejector aperture is varied to change the dispensing volume and the resulting resolution.

The formation of three-dimensional articles by jetting a photosetting or thermosetting material is disclosed in U.S. Pat. No. 5,059,266 to Yamane et al. entitled "Apparatus and Method for Forming Three-Dimensional Article." A jet sequentially or intermittently jets the photosetting or thermosetting material in a droplet form along a flight passage to the stage. An exposure unit is then used to cure the material. In this patent, the amount of resin is varied by providing a first jet having a large jetting amount for greater building speed, and a second jet having a smaller jetting amount for greater resolution or definition. Unfortunately, this approach is more complicated as it requires two different jets, and two associated material delivery systems. Furthermore, the higher building speed still results in lower definition or resolution.

There is an interrelationship between: the carriage speed of a dispensing head, that is, the speed at which the head may be moved; the amount of material that is delivered; the resolution of the features of the article; and the build rate that may be achieved. In other terms, smaller amounts of material may be delivered accurately resulting in an article having a finer resolution. This advantage, however, is traded off against the relatively high carriage speed that may be required to construct the article at a sufficient overall speed.

Other U.S. patents related to three-dimensional modeling are listed as follows: U.S. Pat. No. 5,207,371 to Prinz et al.; U.S. Pat. No. 5,301,415 to Prinz et al.; U.S. Pat. No. 5,301,863 to Prinz et al.; U.S. Pat. No. 5,140,937 to Yamane et al.; U.S. Pat. No. 5,149,548 to Yamane et al.; U.S. Pat. No. 5,204,124 to Secretan et al.; U.S. Pat. No. 4,749,347 to Valavaara; U.S. Pat. No. 5,303,141 to Batchelder et al.; U.S. Pat. No. 5,031,120 to Pomerantz et al.; and U.S. Pat. No. 5,287,435 to Cohen et al.

Accordingly, there is a need in the art for a relatively simple, reliable, and inexpensive method and apparatus for quickly producing accurate three-dimensional articles having complex shapes and features based on article defining data wherein the build rate and resolution can be easily and controllably varied as an article is being produced.

SUMMARY OF THE INVENTION

In view of the foregoing background it is therefore an object of the present invention to provide a method and apparatus for making an article that is relatively fast yet which may use relatively low carriage speeds, and while still providing high accuracy of the article.

This and other objects, features and advantages of the present invention are provided by an apparatus including a processor for controlling a build material dispenser and dispenser positioning means to construct the article in successive layers based upon article defining data, and wherein the processor includes burst control means for operating the dispenser to dispense a series of bursts of build material at a series of respective intended landing or target positions as the dispenser is advanced along the predetermined path of travel. As would be readily appreciated by those skilled in the art, the processor may be a microprocessor operating under stored program control.

Each burst is defined by a plurality of droplets dispensed in relatively rapid succession so that the build material thereof combines, such as by coalescing, at a respective target position. The processor preferably includes gap control means for maintaining a predetermined spacing or gap between the dispenser and the target position so that at least two or more droplets join in traveling between the dispenser and a target position. The demands on carriage or dispenser positioning speed may be relaxed while still providing a relatively high build rate using the bursts of droplets according to the invention.

The build material dispenser is preferably a jet including means, such as a piezoelectric element or actuator, for ejecting a controlled volume or droplet of build material responsive to a corresponding firing signal. Stated somewhat differently, the droplets in each burst represent modulated volumes of dispensed build material. Accordingly, the burst control means preferably includes means for generating a predetermined number of firing signals corresponding to a desired number of droplets in each burst. Each burst may include a predetermined number of droplets in a range of about 2 to 10 droplets. In addition, a jet has a maximum stable excitation frequency so that the burst mode control means may comprise means for operating jet to eject each burst with a plurality of droplets corresponding to the maximum stable excitation frequency of the jet.

Another feature of the present invention is that the processor may include speed control means for advancing the dispenser along the predetermined path of travel at a desired speed. The burst control means further comprises speed responsive means for dispensing each burst with a predetermined number of droplets based upon the desired speed. Accordingly, a layer of build material may be constructed with a relatively uniform thickness. Alternately or in addition thereto, the spacing between bursts may also be controlled.

Yet another feature of the invention is compensation means for operating the dispenser to dispense predetermined ones of the series of bursts defined by different number of droplets at respective target positions along the predetermined path of travel. For example, since each portion of the article may be defined by a segment, the dispenser positioning means or carriage is rapidly accelerated and decelerated. Stated in other words, the dispenser is not moving at a constant speed during the acceleration and deceleration periods. Accordingly, the compensation means includes ramp compensation means to account for the changes in speed. In addition, the compensation means may include clumping compensation means for operating the dispenser to dispense a lesser number of droplets at portions of the article where clumping of build material would otherwise occur. Clumping may occur at a cusp or corner depending upon the properties of the build material, such as shrinkage during cooling.

Another aspect of the invention is that a plurality of jets may be carried together and be relatively aligned so that the build material droplets from all are directed to a common target point. The processor may include means for firing all of the jets substantially simultaneously so that the cumulative build material combines at the common target position to increase the build rate. For even greater build rate, the multi-jet aspect of the present invention may advantageously be combined with the burst control aspect so that bursts of droplets are simultaneously delivered from all of the jets and land at the target position.

Yet another aspect of the present invention is that certain relatively difficult article features may be constructed without introducing undue distortion and inaccuracy in the final article. For example, for an article including first and second contiguous wall portions defining a corner, such as a generally vertically extending corner, for example, the processor preferably includes corner forming means. The corner forming means cooperates with the dispenser and the dispenser positioning means for constructing the corner in successive layers each of first and second segments corresponding to the first and second wall portions so that respective corner points are provided by the first wall segment in a first layer and by the second wall segment in a second layer. In other words, in successive layers "ownership" of the corner point is alternated between the first segment and the second segment.

Another article feature readily constructed according to the invention is an over corner. The over corner is defined by first and second contiguous diverging wall portions. The dispenser positioning means of the apparatus preferably includes means for relatively positioning the dispenser along three directions and rotating dispenser about two axes with respect to said platform thereby defining five degrees of freedom of movement for the dispenser relative to the platform. Accordingly, the diverging first and second wall portions may be readily constructed; however, placement of the corner point is difficult if fired during construction of either wall segment. To overcome this difficulty, the processor preferably includes over corner forming means for constructing the over corner in successive layers each of first and second segments corresponding to the first and second wall portions and while providing respective corner points by at least one droplet or burst of build material dispensed from the dispenser along an axis defined by successive corner points at the over corner. Accordingly, gaps at the corner points for the over corner are avoided increasing both the strength and accuracy of the final article.

Still another feature of the present invention is the provision in the processor of filling means. The filling means allows for accurate and high speed filling of an area of the article, such as a hatched area. The filling means determines an empty volume defined by wall portions of the article and operates the dispenser to dispense a predetermined number of droplets to thereby fill the empty volume.

The present invention also includes various method aspects. A method for making a three-dimensional article based upon article defining data preferably includes the steps of: advancing a build material dispenser along a predetermined path of travel with respect to a platform; and operating the dispenser to dispense a series of bursts of build material at a series of respective target positions as the dispenser is advanced along the predetermined path of travel to thereby construct the article in successive layers based upon the article defining data. Each burst being defined by a plurality of droplets of build material dispensed in relatively rapid succession to combine at a target position. The step of operating the advancing dispenser preferably includes controlling the spacing between the dispenser and the target position so that a plurality of droplets join in flight in each burst.

The step of advancing the dispenser preferably includes advancing the dispenser along the predetermined path of travel at a desired speed, and the step of operating the dispenser preferably includes dispensing each burst with a predetermined number of droplets based upon the desired speed to thereby construct a layer of build material with a relatively uniform thickness. The step of operating the dispenser preferably further comprises operating the dispenser to dispense predetermined ones of the series of bursts defined by a different number of droplets at respective target positions than at other target positions along the predetermined path of travel, such as to compensate for accelerations or potential clumping. In addition, the step of operating the dispenser may include operating the dispenser to dispense each burst with a plurality of droplets corresponding to the maximum stable excitation frequency of a build material jet, for example.

Another method aspect of the invention is for forming a corner and includes the step of constructing the corner in successive layers each of first and second segments corresponding to the first and second wall portions so that respective corner points are provided by the first wall segment in a first layer and by the second wall segment in a second layer. Still another method aspect is for forming an over corner portion of the article and includes the step of constructing the over corner in successive layers each of first and second segments corresponding to the first and second wall portions, and while providing respective corner points by at least one droplet of build material ejected from the jet along an axis defined by successive corner points at the over corner.

A multi-jet head may also be incorporated in the apparatus so that another method aspect of the invention includes operating the jets to eject respective droplets substantially simultaneously from all of the plurality of jets toward a common target position.

BRIEF DESCRIPTION OF THE DRAWINGS

FIG. 8A is a cross-sectional view of a portion of an embodiment of the build material jet according to the invention.

FIG. 8B is a greatly enlarged cross-sectional view of the orifice of the jet of FIG. 8A.

FIG. 9 is a schematic cross-sectional view of a portion of another embodiment of the build material jet according to the invention and having an angled tip.

FIG. 10 is a graph of firing of a build material jet in burst mode as a function of displacement of the jet according to the invention and illustrating compensation for initial acceleration of the jet.

FIG. 11 is a fragmentary view of a portion of a three-dimensional article being constructed and with the build material jet operating to jet build material to fill a hatched area of the article.

FIG. 12 is a greatly enlarged cross-sectional view of a hatched area of FIG. 11 being filled with build material.

FIG. 13 is a schematic view of a multi-jet build material jet assembly according to another aspect of the invention.

FIG. 14 is a perspective view of an article illustrating construction of a corner of the article in an alternating fashion.

FIG. 15 is a perspective view of an article illustrating construction of an over corner of the article by accurately jetting a quantity of build material to complete the corner.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, applicants provide these embodiments so that this disclosure will be thorough and complete, and will fully convey the scope of the invention to those skilled in the art. Like numbers refer to like elements throughout.

Figure 1:
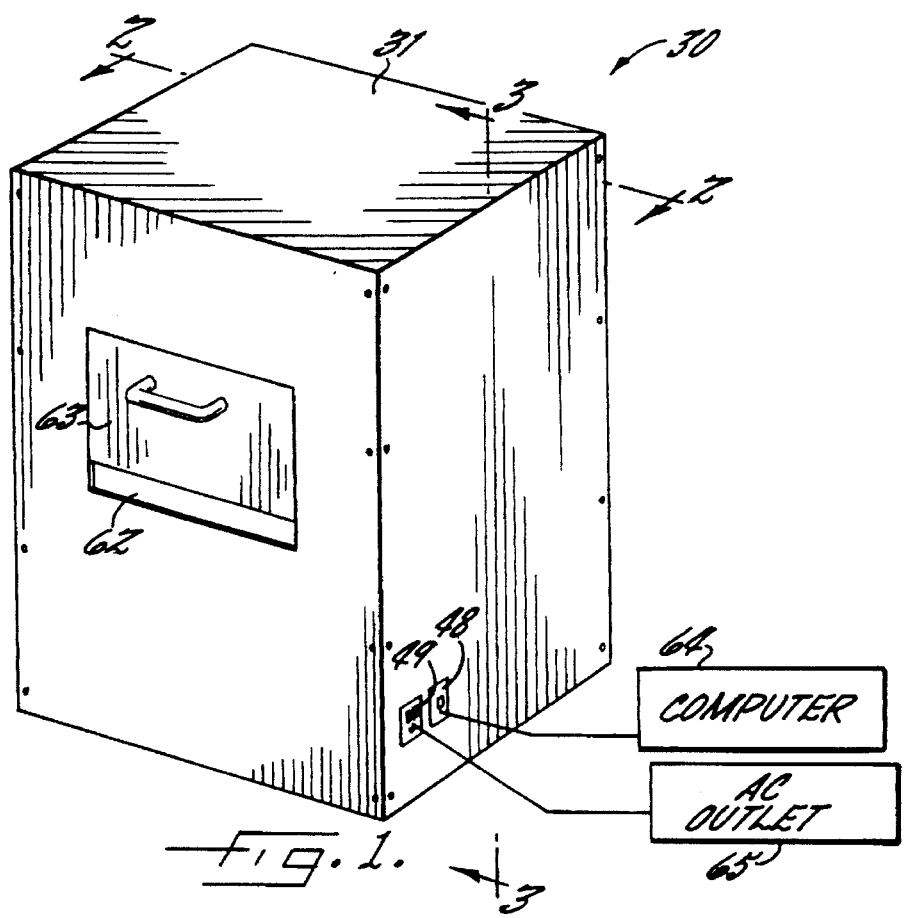
FIG. 1 is a perspective view of the apparatus according to the invention.
Figure 4:
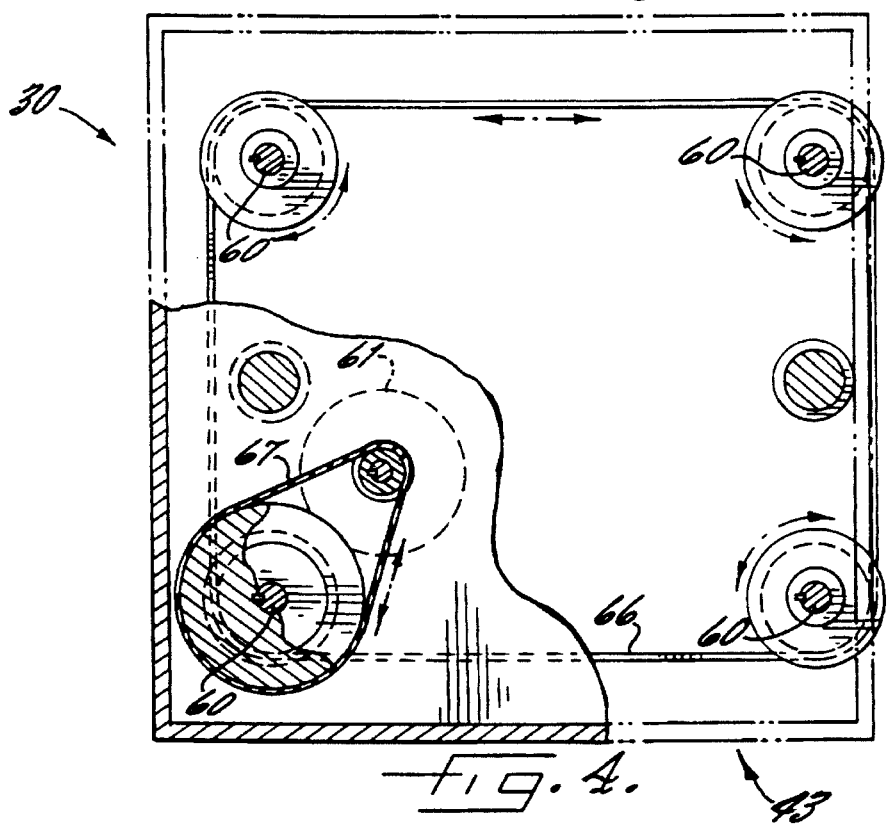
FIG. 4 is a cross-sectional view taken along lines 4—4 of FIG. 2.

As illustrated in FIG. 1, the three-dimensional article manufacturing apparatus 30 according to the invention includes a generally rectangular housing 31. The housing includes an access opening 62 closed by a sliding door 63. A power port 49 facilitates electrical connection to an external power source such as from an AC outlet 65 shown in schematic form. A computer port 48 allows connection to an external computer 64 also shown in schematic form. An external computer 64, such as a work station or personal computer, is used to generate a digital data file containing the three-dimensional coordinate data defining an article or model to be built. For example, the data may be from an STL file which defines the article in triangular facets, as would be readily understood by those skilled in the art.

In addition, it will be understood by those having skill in the art that the data file may be transferred to the modeling apparatus by a transferable memory medium such as a magnetic disk or tape, or a microelectronic memory, not shown. Accordingly, the apparatus 30 may be adapted to receive coordinate data from any number of sources having the appropriate electronic data format. If data is transferred by a transferable memory medium, for example, the apparatus 30 may include a disk drive, a tape reader, or other means for reading electronic data from a transferrable memory medium.

Figure 2:
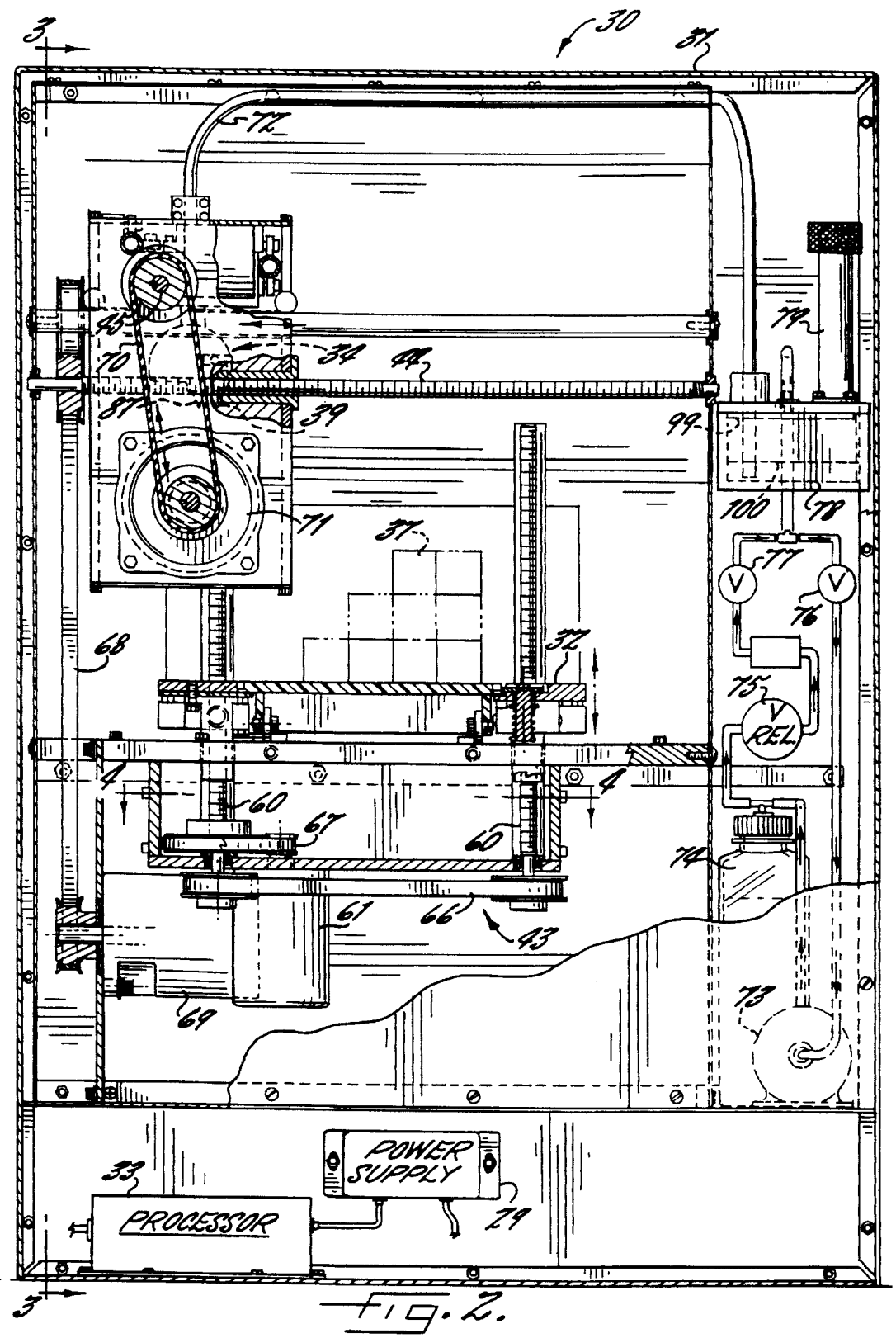
FIG. 2 is a greatly enlarged cross-sectional view taken along lines 2—2 of FIG. 1.

As illustrated in FIG. 2, the apparatus 30 includes a processor 33 which receives the digital data file and translates the data therein to control signals, as described further herein. The apparatus 30 also includes a power supply 29 as illustrated.

Figure 5:
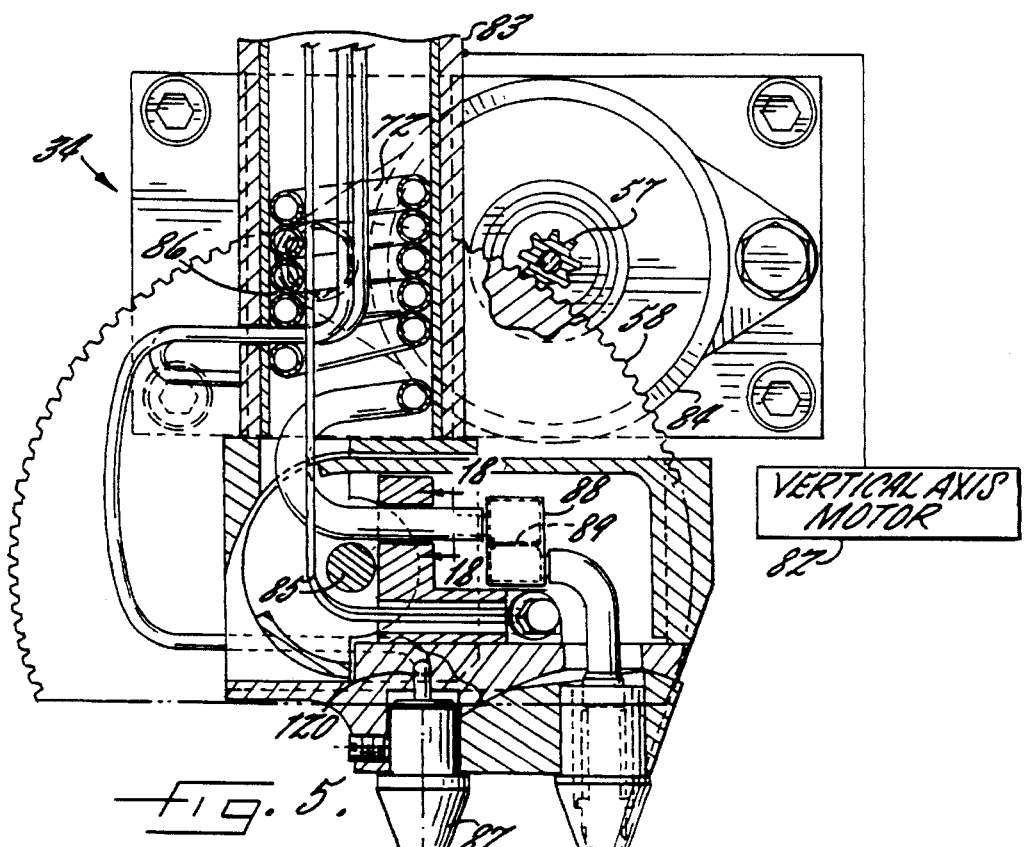
FIG. 5 is a greatly enlarged view, partially in section, of a build material jet assembly according to the invention and illustrating the jet positioned to fire vertically downward.
Figure 6:
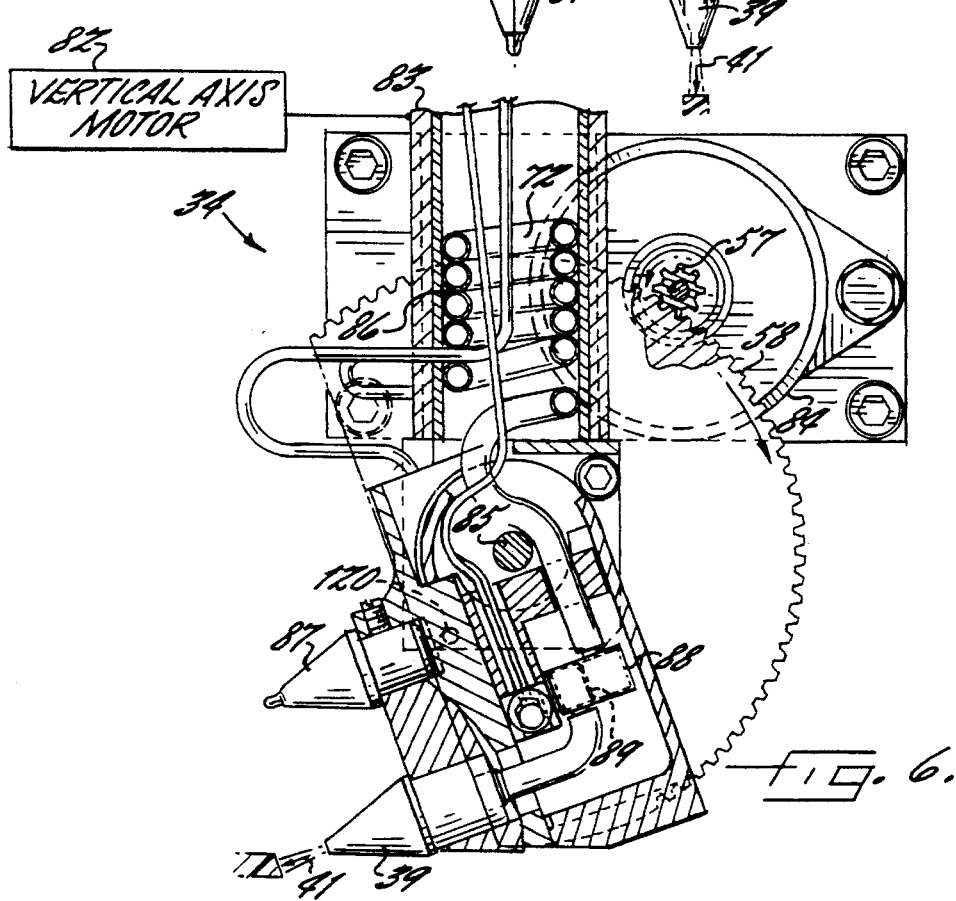
FIG. 6 is a greatly enlarged view, partially in section, of a build material jet assembly according to the invention and illustrating the jet positioned to fire nearly horizontally.
Figure 7:
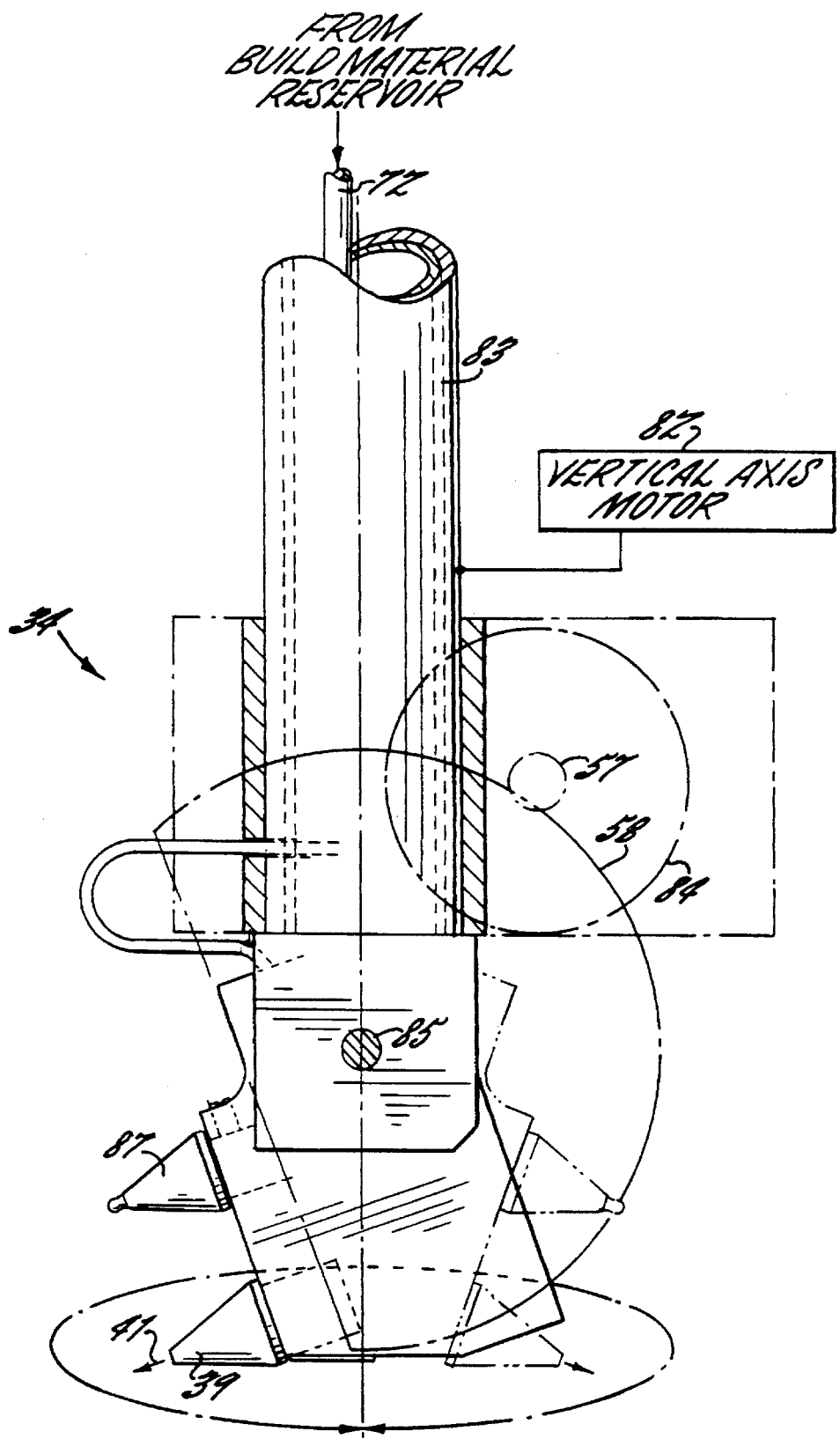
FIG. 7 is a schematic side elevational view of the build material jet assembly illustrating rotation of the assembly about vertical axis.

The apparatus 30 includes a platform 32 on which the article 37 is built, and a ballistic jetting head 34 (FIGS. 5–7). Droplets of liquid build material are ballistically jetted from a piezoelectric jet 39 carried by jetting head 34 to the platform 32 in order to construct the article 37. The build material is normally solid when at the temperature of the interior of the apparatus. The build material is heated to maintain the build material in a liquid state. Accordingly, heated liquid droplets of build material are jetted from the jetting head 34 to a target position on either the platform 32 or a portion of previously jetted build material. On contact with the platform or previously jetted build material, the heated liquid droplets cool and solidify.

The piezoelectric jet 39 may also be positioned relatively close to the target position so that the build material may, in a sense, not be considered as traveling ballistically. Accordingly, the terms ejected and jetted are also used herein and describe a relatively small gap or no gap. The illustrated piezoelectric jet 39 is but one embodiment of a dispenser for dispensing build material in metered quantities and to precise target landing positions. It being readily understood by those of skill in the art, that other types of build material dispensers are also contemplated by the invention that can meter build material and accurately deliver it to a target position. Moreover, the term droplet as used herein is intended to cover individual or discrete volumes of build material that may be ejected, for example, by the piezoelectric jet 39. In addition, the term droplet is also intended to cover a volumetrically modulated stream of build material, wherein small quantities or volumes of build material may be connected to adjacent volumes without becoming discrete entities, such as because of a relatively small gap or because of the speed of dispensed build material, for example.

Figure 3:
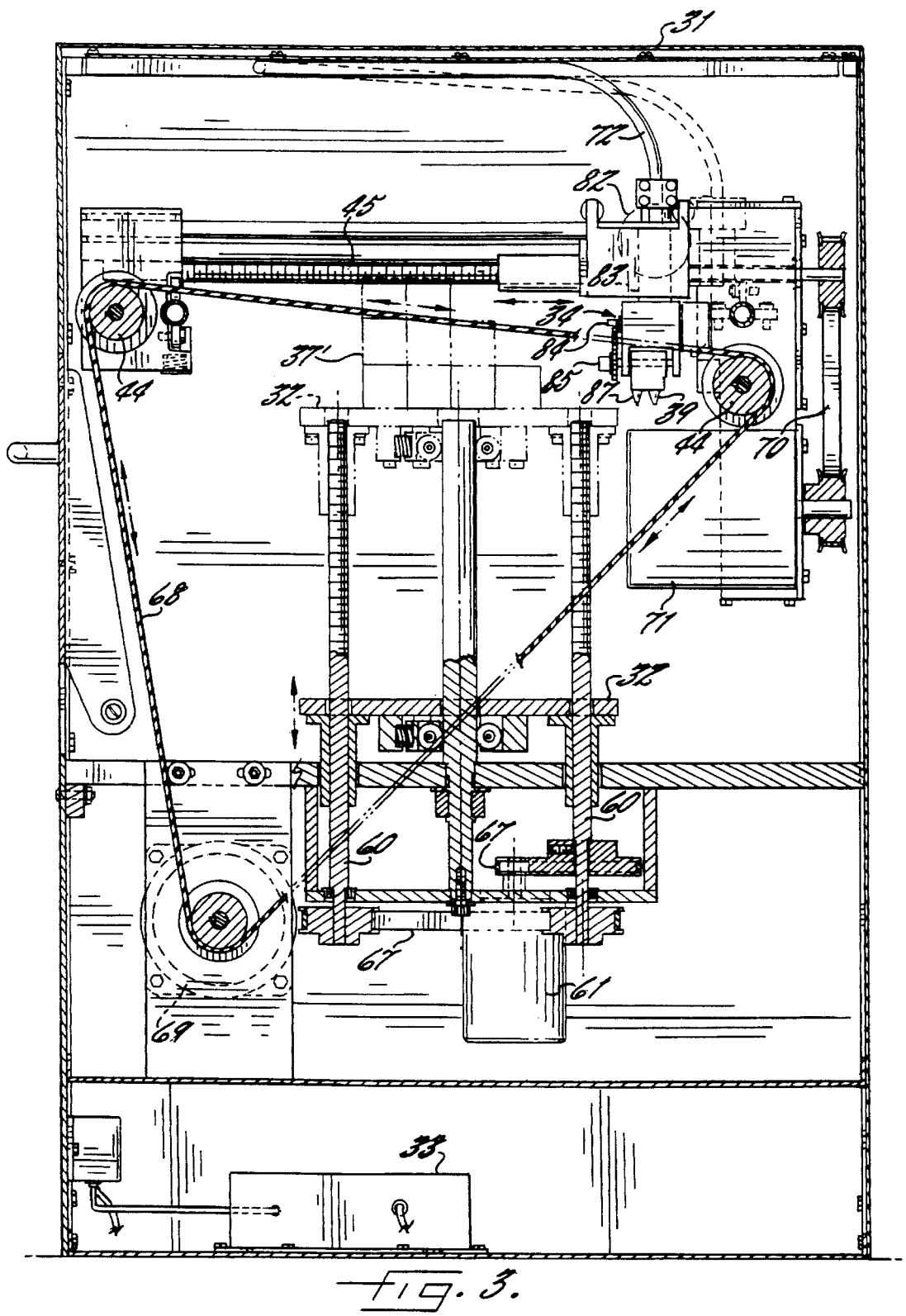
FIG. 3 is a greatly enlarged cross-sectional view taken along lines 3—3 of FIG. 1.

In a preferred embodiment, the apparatus 30 includes positioning means for moving the ballistic droplet jetting head 34, including the piezoelectric jet 39 and the thermal normalization means, such as the illustrated heated body 87, in relation to the platform 32. Orthogonal drive shafts facilitate the movement of the jetting head 34 in the X- and Y-directions relative to the platform 32. As illustrated in FIGS. 2 and 3, a pair of X-axis drive shafts 44, which are driven by X-axis motor 69 and X-axis drive belt 68, facilitate movement of the jetting head 34 in the X-direction. Y-axis drive shaft 45, which is driven by Y-axis drive motor 71 and Y-axis drive belt 70 facilitates movement of the ballistic droplet jetting head 34 in the Y-direction. As will be understood by those having skill in the art, movement of the jetting head 34 in the X- and Y-directions may also be provided by an r/θ positioner including an arm adapted for radial movement at an angle θ, and a positioner for positioning the jet at a radius, r, along the arm.

In the illustrated embodiment, relative movement in the Z-direction is provided by a Z-axis positioner 43 which moves the platform 32 up and down in the Z-direction. The Z-axis positioner includes vertical drive shafts 60 which engage the platform 32. The drive shafts 60 are driven by the vertical drive motor 61 and vertical drive belts 66 and 67.

Referring more particularly to FIG. 2, liquid build material is supplied from a build material reservoir 78 to the jetting head 34 through the build material delivery hose or conduit 72. The build material reservoir 78 and the delivery hose 72 both include means for heating the build material so that it remains in a liquid state. In a preferred embodiment, both the build material reservoir 78 and the delivery hose 72 include an electrical heating element (not shown). The build material reservoir 78 also includes a fill tube 79, and a connection to a pneumatic system for applying either vacuum or pressure to the build material. The pneumatic system includes a pump 73, an accumulator 74, a pressure regulator 75, a purge valve 76, and a fill valve 77.

A relatively constant level of liquid build material is maintained in the build material reservoir 78, so that the surface level of the liquid build material in the build material reservoir 78 is maintained at a relatively constant elevation with respect to the piezoelectric jet 39. Dashed lines represent a nearly full liquid level 99 and a nearly empty liquid level 100 of build material in the build material reservoir 78. In preferred embodiments, the jet 39 is situated above the surface level of the liquid build material, and in a most preferred embodiment, the jet 39 is located 1 to 3 inches above the surface level of the liquid build material to maintain a negative meniscus at the orifice of the piezoelectric jet 39.

As illustrated perhaps best in FIGS. 5 and 6, the ballistic droplet jetting head 34 includes means for rotating the piezoelectric jet 39 and the thermally conductive body 87 about a horizontal axis. The axis is defined by a horizontal shaft 85 which is driven by an associated motor 84 through drive gears 57 and 58. Accordingly, the firing direction 41 may be adjusted from vertical, as shown in FIG. 5, to near horizontal as shown in FIG. 6. FIGS. 5 and 6 also further illustrate the positioning means which rotates the jetting head 34 about a vertical axis on shaft 83. This rotation is powered by vertical axis rotation motor 82 shown in schematic form.

The jetting head 34 preferably carries both the piezoelectric jet 39 and the heated body 87. Both of these elements are heated to a temperature above the melting point of the build material. This heat may be generated by an electrical heating material. In a preferred embodiment, an electrical heater, such as a resistive wire 120, is operatively connected to the heated body 87. Accordingly, the jet 39 receives heated liquid build material from the delivery hose 72 and maintains the build material in a liquid state prior to jetting. The heated body may be used to normalize surface portions of a partially completed article by melting and displacing build material.

Liquid build material is supplied to the jet 39 through the build material delivery hose 72. The delivery hose 72 is formed into a spiral coil 86 within the vertical shaft 83. This coil enables rotation of the ballistic droplet jetting head 34 without restricting the flow of build material through the hose 72 and without requiring a rotating seal. The build material flows from the hose 72 through a baffle 88 and a filter 89 to the jet 39.

FIG. 7 illustrates rotation of the ballistic droplet jetting head 34 about the vertical shaft 83. The build material delivery hose 72 enters the jetting head through the shaft 83. By rotating the shaft 83, the entire jetting head 34, including the jet 39 and the heated body 87, may be rotated 360 degrees about a vertical axis by the vertical axis motor 82.

FIG. 8A illustrates the flow of build material from the build material delivery hose 72 to the orifice 40 of the piezoelectric jet 39. The heated liquid build material from hose 72 enters baffle 88 before passing on to the jet 39. The baffle 88 provides two 90 degree bends in the path of the flow of build material. Accordingly, acoustic waves generated upstream from the baffle 88 are dissipated as they strike wall 105 of the baffle. Filter 89 provides a further reduction in the acoustic waves. The filter 89 also prevents the passage of particles into the jet 39 where such particles could become lodged at the orifice 40. The build material passes from the baffle 88 through the tubular connection 106 to the piezoelectric jet 39. A build material passage 104 within the piezoelectric jet 39 provides fluid communication between the baffle 88 and the orifice 40. As discussed above, a heating element, such as an electrical resistance wire is used to maintain the build material in a liquid state as it passes from the hose 72 to the baffle 88, tubular connection 106, and jet 39.

As previously discussed with regard to FIGS. 2 and 3, the jet 39 including an orifice 40 is maintained a predetermined elevation above the surface level of liquid build material in the build material reservoir 78. Accordingly, a predetermined back pressure results at orifice 40. As illustrated in FIG. 8B, orifice 40 has a predetermined diameter such that the liquid build material maintains a negative meniscus 103 at the orifice 40 under the influence of the back pressure.

Referring again to FIG. 8A, the piezoelectric jet 39 includes a body 102, a build material flow passage 104, and a piezoelectric element 101. Upon application of an electric signal to piezoelectric element 101, the piezoelectric element either contracts or expands depending on the polarity of the signal. In response, an acoustic wave is generated in the liquid build material located in the build material flow passage 104. This acoustic wave is transmitted through the liquid build material to the negative meniscus 103 at the orifice 40. As a result of the acoustic wave, a droplet of heated liquid build material having a predetermined volume is jetted from the orifice 40 in firing direction 41 at a predetermined velocity. The volume and velocity of the droplet are functions of the diameter of the orifice; the size of the piezoelectric element 101; the intensity and polarity of the electrical signal; and the temperature, surface tension and viscosity of the liquid build material. In preferred embodiments, it has been found that stable operation of the piezoelectric jet 39 can be sustained at frequencies of up to 12 KHz. Accordingly, the piezoelectric jet 39 is capable of firing 12,000 droplets per second wherein each droplet has a predetermined volume, velocity and firing direction.

The build material typically melts at a temperature of from about 50° C. to 250° C., cools quickly and adheres to itself, and has a low rate of shrinkage. Such a build material preferably comprises a solution of a resin having a hydroxyl number of from about 5 to 1000, and a molecular weight greater than about 500, dissolved in at least one primary aromatic sulfonamide preferably having a melting point greater than about 25° C. The rheology of the build material is preferably such that a droplet remelts portions of deposited material so as to form a flowable bead.

With respect to the resin portion of the build material, Applicants do not wish to be bound by any one theory, but believe that a resin having hydroxyl functionality, as defined by hydroxyl number, through hydrogen bonding, holds together the droplet after jetting through the jetting head. The upper limit of hydroxyl number (i.e., 1000) is important in that the higher the hydroxyl number, the higher the heat capacity of the resin, and the resin cools slower. Slower cooling is undesirable in that the build material tends to sag if it cools slowly as the article is being built. Exemplary resins include polyester resins, phenolic resins, polyamides, vinyl ester resins, polyurethanes, amino resins, melamine resins, urea resins, epoxy resins, and naturally-derived polymers such as coumarin-indene, shellac, protein and cellulosics (e.g., ethyl cellulose, ethyl hydroxy ethyl cellulose, nitro cellulose, etc.), and mixtures thereof.

Suitable polyester resins include practically any esterification product of a polybasic organic acid and a polyhydric alcohol. Polyester resins can also be derived from the esterification of a polycarboxylic acid or anhydride with a polyhydric alcohol. Suitable phenolic resins include practically any reaction product of an aromatic alcohol with an aldehyde. Particularly preferred, are the phenolic resins prepared by the reaction of phenol with formaldehyde. Suitable vinyl ester resins include practically any reaction product of an unsaturated polycarboxylic acid or anhydride with an epoxy resin. Exemplary epoxies include virtually any reaction product of a polyfunctional halohydrin, such as epichlorohydrin, with a phenol or polyhydric phenol. Specific resins include acrylics, styrene-acrylic copolymers and styrene-allyl alcohol copolymers. Typically, the build material includes about 1 to 50 percent of the resin, preferably about 5 to 30 percent, and more preferably about 5 to 15 percent, by weight of the resin.

With respect to the primary aromatic sulfonamide, it is believed that the primary aromatic sulfonamides provide the necessary self adhesion properties to the build material. Suitable aromatic sulfonamides are preferably primary $C_1$ to $C_{15}$ benzenesulfonamides, and most preferably the substitution is alkyl and is at the para position. Exemplary primary aromatic sulfonamides include p-toluenesulfonamide, p-n-ethylbenzenesulfonamide, p-methoxybenzenesulfonamide, p-n-nonylbenzenesulfonamide, p-n-butylbenzenesulfonamide, and mixtures thereof. Typically the build material includes about 1 to 50 percent, preferably about 70 to 90 percent, and more preferably about 75 to 90 percent by weight of one or more of the aromatic sulfonamides. Particularly preferred is a 50/50 mixture of p-toluenesulfonamide and p-n-ethylbenzenesulfonamide.

The build material can include antioxidants (e.g., Ultranox 626 available from Borg Warner Chemicals, Inc.), flexibilizers, magnetic particles, pigments, and fluorescent agents, and other additives, the addition of which is within the skill of one in the art. Dyes can be added to the build material. Suitable dyes include FD & C Blue #1, Neozapon Red 492, Savinyl Black RLS and the like. Another additive could be a secondarily reactive organic compound such as one activated by exposure to UV light. These compounds can be used to provide an article which can be hardened so as to be unmeltable or machinable. Typically, the build material includes from about 1 to 10 percent by weight of the various additives.

Suitable build materials are further described in commonly assigned copending U.S. patent application Ser. No. 08/325,694, the entire disclosure of which is incorporated herein by reference. In addition, other features of the dispensing or jetting of build material are further described in commonly assigned copending patent applications Ser. No. 08/326,015; Ser. No. 08/326,009; and Ser. No. 08/326,004, the entire disclosures of which are incorporated herein by reference.

In FIG. 9, there is illustrated a piezoelectric jet 39' having a firing direction 41' oriented at an angle α relative to the jet axis 107 defined by the cylindrical body 102. This orientation is obtained by providing a tip 108 which is curved. This embodiment has the advantage of allowing the firing direction 41' to be close to horizontal without requiring the body 102 of the jet 39' to be rotated so close to the horizontal position. The wider body 102 portion of the jet 39 containing the piezoelectric element 101 might otherwise come into contact with previously jetted layers of build material. In a preferred embodiment, the angle α is 20 degrees.

A linear wall portion of a three-dimensional article may be formed as illustrated in FIG. 10. The build material jet 39 is advanced along a path of travel 304 parallel to the surface 307 on which the linear wall portion is to be built. The surface 307 may be either a portion of the platform 32 of the apparatus 30, or a previously jetted layer of build material.

As the jet 39 is advanced, it passes over intended landing positions or target positions 303a–303g. When the jet 39 is in position relative to a respective target position, a burst of build material is jetted. Each burst of build material is defined by a plurality of droplets jetted in relatively rapid succession, so that the build material in the burst combines, such as by coalescing at a respective target position. As shown in FIG. 10, each burst 302a–302g corresponds to a respective target position 303a–303g. Each burst may preferably include 2 to 10 droplets, depending on the desired build rate, definition, and jet velocity. Since the droplets within a burst are jetted in rapid succession, aerodynamic effects such as drag and drafting, as well as the distance traveled, may cause the plurality of droplets in each burst to join in flight between the jet 39 and the respective target position. This effect is illustrated in FIG. 10 wherein the droplets of bursts 302a–302c have all joined while at least one droplet in each of later fired bursts 302d–302g remain separate.

For certain gaps or spacings, the droplets do not fully separate upon exit from the jet 39. At a spacing of about 0.010 inches, a 12 KHz jet excitation frequency, and a droplet velocity of about 4 m/sec, for example, the droplets do not fully separate before landing. In addition, at a spacing of about 0.060 inches, a 12 KHz excitation frequency, and a velocity of 3.5 m/sec, the droplets separate and join again in flight due to drafting and drag forces before landing. Further, at a spacing of about 0.080 inches, a 12 KHz excitation frequency, and a velocity of 2 m/sec, the droplets separate and do not join again in flight before landing. For a preferred embodiment of the invention, the droplets in a burst may join in traveling to the target landing position.

When the jet 39 is advanced at a constant velocity 308, each burst 302d–302g corresponding to target positions 303d–303g may include the same predetermined number of droplets. Accordingly, a wall portion 306 may be extended across the surface 307 with a constant height, definition and build rate. The number of droplets in each burst may be in the range of 2 to 10 droplets. In a preferred embodiment, the jet 39 is advanced at a constant velocity 308 while jetting bursts 302d–302g including 5 droplets of build material toward respective intended landing or target positions 303d–303g. In this embodiment, the respective target points 303d–303g may preferably be spaced by about 0.0045 inches. In comparison, it has been found that when firing discreet evenly-spaced droplets, the spacing between target positions is most preferably 0.003 to 0.004 inches in order to maintain adequate definition and continuity. Accordingly, by operating the jet so as to produce 5 droplet bursts, the jet can be advanced at half the velocity while achieving twice the build rate when compared to a single droplet operation. The reduced carriage speed has the advantage of allowing a more controllable operation while the increased build rate reduces the time required to manufacture the article.

The jet is advanced by a jet positioning means (shown in FIGS. 2–7). A processor controls the jet and the positioning means so that each burst is fired from the moving jet as a plurality of droplets or precisely metered quantities, and that these droplets of build material ultimately combine at respective target positions. The processor includes burst control means for controlling the operation of the jet. As shown in FIG. 10, the burst control means may generate a firing signal burst 305a–305g corresponding to respective target positions 303a–303g and bursts 302a–302g. Each pulse within a firing signal burst results in the firing of a single droplet of build material from the jet 39. Accordingly, for the burst of firing signals 305a including two pulses, and build material burst 302a includes two droplets of build material. The number of pulses in each firing signal burst 305a–305g corresponds to a desired number of droplets in each respective build material burst 302a–302g.

As previously discussed, the build rate and the definition of the article are determined by a combination of the jet velocity, the spacing of the target positions, and the number of droplets per burst. Accordingly, the processor may include compensation means for operating the jet to eject predetermined bursts in the series of bursts such that the predetermined bursts have a lesser or greater number of droplets. In one embodiment, the compensation means includes ramp compensation means for operating the jet so that predetermined bursts have a lesser number of droplets when the jet is being accelerated. As shown in FIG. 10, a previously jetted wall portion 306 is to be extended across surface 307. When the jet is first positioned over the end of the wall portion 306, the jet velocity is zero. As the jet is advanced, the velocity increases or ramps until reaching the desired constant velocity 308. In order to ensure a constant build rate and consistent dimensions of the article, the ramp compensation means may also operate the jet so as to fire more closely spaced build material bursts having fewer droplets while the jet advances at a lower velocity. Accordingly, the number of droplets in each of the build material bursts 302a–302d increases from 2 to 5, and the separation of target positions 303a–303d increases as the jet velocity increases.

In another embodiment, the compensation means includes clumping compensation means wherein a lesser number of droplets are fired in each build material burst corresponding to portions of the article where clumping of build material might otherwise occur. Clumping may be defined as an irregularity in the dimensions or accuracy of a portion of the article which most often occurs at the beginning or end of the linear portion, such as defining a cusp or a corner point. By producing bursts having a lesser number of droplets at portions of the article where irregularities may otherwise occur, the effect of clumping may be reduced.

The jet 39 has a maximum stable excitation frequency, which is determined by the diameter of the orifice 40, the size of the piezoelectric element, and the characteristics of the liquid build material. In a preferred embodiment, the jet is operated so as to eject each burst with a plurality of droplets corresponding to the maximum stable excitation frequency of the jet. This maximum stable excitation frequency may be about 12,000 excitations per second. As shown in FIG. 10, each pulse in a firing signal burst 305a–305g is closely grouped so that the droplets within each burst 302a–302g combine at the respective target positions 303a–303g.

In another aspect of the present invention, the jet may be operated so as to eject a predetermined number of droplets into an empty volume defined by wall portions of an article, thereby filling the empty volume. As would be readily understood by those skilled in the art, the entire bounded volume need not be filled completely. As shown in FIG. 11, a partially formed article 37 may include a horizontal wall 312 and a vertical wall 313 bounding an interior section of the article. The interior may be filled with a support structure such as hatching 311. The support structure such as hatching 311 may add strength, stability, and weight to predetermined portions of the article. The hatching also defines an empty volume 314. The volume 314 may be filled with build material 315 so as to provide additional strength, stability, or weight.

An empty volume 314 defined by hatching 311 is illustrated in FIG. 12. The jet 39 is positioned above the volume 314 and fired so as to fill the volume 314 with build material 315. By firing the jet continuously at the maximum stable operating frequency, a relatively large volume defined by hatching 311 may be filled relatively quickly. By dispensing the build material in mass, the heat is not dissipated as quickly from individual droplets, thereby increasing the time required for individual droplets to solidify. Accordingly, a relatively small empty volume may be filled with a precise volume of build material. The volume of the build material dispensed may be accurately determined to within the volume of a single droplet.

In still another embodiment, the apparatus includes a plurality of build material jets 322a–322g positioned adjacent the platform for ballistically jetting or ejecting build material as a plurality of droplets, and the plurality of jets are directed so as to have a common target position 320. FIG. 13 is a schematic representation of 7 jets 322a–322g having respective firing paths or directions 321a–321g. As illustrated, each jet is oriented so that all firing paths intersect at a common target position 320. The jets are also positioned so that the distance from each jet to the common landing point is the same. Preferably, all seven jets are carried by or contained within a single housing as illustrated.

In a preferred embodiment, each jet 322a–322g has an identical respective flow passage, piezoelectric element, and orifice. Accordingly, each jet produces a droplet of build material having a common size and velocity. When all jets are simultaneously fired, 7 identical droplets of build material meet at the common target position 320. This aspect of the invention has the advantage of controlling the volume of material jetted in response to a single firing signal pulse. By firing one or more jets simultaneously, the volume delivered may be controlled without changing the characteristics of the jet. Accordingly, there is no need to adjust a pressure, an orifice size, or a valve. The multi-jet embodiment illustrated in FIG. 13 may be used to generate a single "droplet" seven times the size of a single jet. The multi-jet embodiment may also be used to fire bursts of droplets with the size of each droplet determined by the number of jets fired.

In yet another aspect of the invention, the processor may include corner forming means for constructing the illustrated generally vertical corner 330 in successive layers. The first wall portion 335 includes segments 331 and 333, while the second wall portion includes segments 332 and 334. These wall portions meet at a vertical corner 330. In the first layer, including first segment 331 and second segment 332, the corner point is provided by the first segment 331. In the second layer, including segments 333 and 334, the corner point is provided by the second segment 334. The first and second layers as described may be immediately adjacent one another, or the first and second layers may be separated by intermediate layers. Furthermore, alternating layers of segments may be jetted as the jet 39 is advanced in opposite directions as shown by arrows 337a–337f. By alternating the segment providing the corner point, the strength of the article at the corner is enhanced.

In yet another aspect of the present invention, the processor includes over corner forming means for constructing an over corner in successive layers. As shown in FIG. 15, a three-dimensional article may include first 341 and second 342 contiguous diverging wall portions defining an over corner 343. The over corner 343 illustrated in FIG. 15 is oriented so that an axis 340 defined by successive corner points is oriented at an angle α with respect to a vertical line 347. When forming first 344 and second 345 segments corresponding to the first and second wall portions, it may be necessary to provide a respective corner point 346 by accurately providing at least one droplet of build material fired from the jet 39 along an axis 340 defined by successive corner points at the over corner 343. Accordingly, the segments 344 and 345 may be completed at the corner point 346 despite the presence of the over corner 343.

The segments described above relating to the corner forming and over corner forming means in the illustrated embodiment are linear segments. However, those skilled in the art will readily appreciate that curved or arcuate segments are also contemplated by the invention. Moreover, many modifications and other embodiments of the invention will come to the mind of one skilled in the art having the benefit of the teachings presented in the foregoing descriptions and the associated drawings. Therefore, it is to be That which is claimed:

1. An apparatus for making a three-dimensional article based upon article defining data, said apparatus comprising:
   a platform;
   a build material dispenser positioned adjacent said platform for dispensing build material in a plurality of droplets;
   dispenser positioning means for advancing said dispenser along a predetermined path of travel with respect to said platform; and
   a processor for controlling said dispenser and said dispenser positioning means to construct the article based upon the article defining data, said processor comprising burst control means for operating said dispenser to dispense a series of bursts of build material toward a series of respective target positions to construct a continuous portion of the article as said dispenser is continuously advanced along the predetermined path of travel, each burst being defined by a plurality of successive droplets dispensed in relatively rapid succession to each other as compared to a last droplet in one burst and an initial droplet in a next succeeding burst so that the build material of the plurality of successive droplets of a burst combines at a respective target position.

2. An apparatus according to claim 1 wherein said dispenser comprises a jet for ejecting the build material in a plurality of droplets.

3. An apparatus according to claim 2 wherein said jet comprises means for ejecting a droplet of build material responsive to a corresponding firing signal, and wherein said burst control means comprises means for generating a predetermined number of firing signals corresponding to a desired number of droplets in each burst.

4. An apparatus according to claim 2 wherein said jet has a maximum stable excitation frequency, and wherein said burst control means comprises means for operating said jet to eject each burst with a plurality of droplets corresponding to the maximum stable excitation frequency of said jet.

5. An apparatus according to claim 2 further comprising a second jet operatively connected to said dispenser positioning means and said processor, and wherein said second jet is aligned to have a common target position with the first jet.

6. An apparatus according to claim 2 wherein said jet comprises a housing, and a piezoelectric actuator positioned within said housing for dispensing the plurality of droplets of build material therefrom.

7. An apparatus according to claim 1 wherein said processor further comprises gap control means for maintaining a predetermined gap between said dispenser and each target position so that a plurality of droplets join in traveling between said dispenser and a respective target position.

8. An apparatus according to claim 1 wherein said processor further comprises burst spacing control means for advancing said dispenser along the predetermined path of travel and operating said dispenser to dispense each burst with a predetermined spacing from adjacent bursts.

9. An apparatus according to claim 1 wherein said processor further comprises speed control means for advancing said dispenser along the predetermined path of travel at a desired speed, and wherein said burst control means further comprises speed responsive means for operating said dispenser to dispense each burst with a predetermined number of droplets based upon the desired speed to construct a layer of build material with a relatively uniform thickness.

10. An apparatus according to claim 9 wherein said speed control means includes means for advancing said dispenser along a portion of the predetermined path of travel at a substantially constant speed; and wherein said speed responsive means includes means for operating said dispenser to dispense each burst with a constant number of droplets while said dispenser is advanced at the constant speed.

11. An apparatus according to claim 1 wherein said burst control means further comprises compensation means for operating said dispenser to dispense predetermined ones of said series of bursts defined by a different number of droplets at respective target positions than at other target positions along the predetermined path of travel to compensate for at least one of a speed of said dispenser and clumping of build material.

12. An apparatus according to claim 11 wherein said compensation means comprises ramp compensation means for operating said dispenser to dispense predetermined bursts defined by a lesser number of droplets when a speed of said dispenser is being changed.

13. An apparatus according to claim 11 wherein said compensation means further comprises clumping compensation means for operating said dispenser to dispense predetermined bursts defined by a lesser number of droplets at portions of the article where clumping of build material would otherwise occur.

14. An apparatus according to claim 1 wherein said burst control means comprises means for operating said dispenser to dispense each burst with a number of droplets in a range of about 2 to 10 droplets.

15. An apparatus according to claim 1 wherein the three-dimensional article includes first and second contiguous wall portions defining a corner, and wherein said processor comprises corner forming means for constructing the corner in successive layers each of first and second segments corresponding to the first and second wall portions so that respective corner points are provided by the first segment in a first layer and by the second segment in a second layer.

16. An apparatus according to claim 15 wherein the first and second layers are immediately adjacent one another.

17. An apparatus according to claim 1 wherein said dispenser positioning means comprises means for relatively positioning said dispenser along three directions and rotating said dispenser about two axes with respect to said platform thereby defining five degrees of freedom of movement for said dispenser relative to said platform.

18. An apparatus according to claim 1 wherein the three-dimensional article includes first and second contiguous diverging wall portions defining an over corner, and wherein said processor comprises over corner forming means for constructing the over corner in successive layers each of first and second segments corresponding to the first and second wall portions and while providing respective corner points by at least one burst of build material dispensed from said dispenser along an axis defined by successive corner points at the over corner.

19. An apparatus according to claim 1 wherein said processor comprises filling means for determining an empty volume defined by wall portions of the article and for operating said dispenser to dispense a predetermined number of droplets to thereby fill the empty volume.

20. An apparatus for making a three-dimensional article based upon article defining data, said apparatus comprising:
   a platform;

a build material dispenser positioned adjacent said platform for dispensing build material in a plurality of droplets;

dispenser positioning means for advancing said dispenser along a predetermined path of travel with respect to said platform; and a processor for controlling said dispenser and said dispenser positioning means to construct the article based upon the article defining data, said processor comprising burst control means for operating said dispenser to dispense a series of bursts of build material toward a series of respective target positions to construct a continuous portion of the article as said dispenser is continuously advanced along the predetermined path of travel, each burst being defined by a plurality of successive droplets dispensed in relatively rapid succession to each other as compared to a last droplet in one burst and an initial droplet in a next succeeding burst so that the build material of the plurality of successive droplets of a burst combines at a respective target position;

said processor further comprising means for operating said dispenser to dispense predetermined ones of said series of bursts with at least one of a different number of droplets and with a different spacing between adjacent bursts along the predetermined path of travel to thereby construct a continuous portion of the article with a relatively uniform thickness.

21. An apparatus according to claim 20 wherein said dispenser comprises a jet for ejecting the build material in a plurality of droplets.

22. An apparatus according to claim 20 wherein said processor further comprises gap control means for maintaining a predetermined gap between said dispenser and each target position so that a plurality of droplets join in traveling between said dispenser and a respective target position.

23. An apparatus according to claim 20 wherein said dispenser positioning means comprises means for relatively positioning said dispenser along three directions and rotating said dispenser about two axes with respect to said platform thereby defining five degrees of freedom of movement for said dispenser relative to said platform.

24. An apparatus for making a three-dimensional article based upon article defining data, the article including first and second contiguous wall portions defining a corner, said apparatus comprising:

a platform;

a build material dispenser positioned adjacent said platform for dispensing build material in a plurality of droplets;

dispenser positioning means for advancing said dispenser along a predetermined path of travel with respect to said platform; and a processor for controlling said dispenser and said dispenser positioning means to construct the article in successive layers based upon the article defining data, said processor comprising corner forming means for constructing the corner in successive layers each of first and second segments corresponding to the first and second wall portions so that respective corner points are provided by the first segment in a first layer and by the second segment in a second layer.

25. An apparatus according to claim 24 wherein said processor further comprises burst control means for operating said dispenser to dispense a series of bursts of build material toward a series of respective target positions as said dispenser is advanced along the predetermined path of travel, each burst being defined by a plurality of droplets dispensed in relatively rapid succession so that the build material thereof combines at a respective target position.

26. An apparatus according to claim 24 wherein said processor further comprises gap control means for maintaining a predetermined gap between said dispenser and each target position so that a plurality of droplets join in traveling between said dispenser and a respective target position.

27. An apparatus according to claim 24 wherein said dispenser comprises a jet for ejecting the build material in a plurality of droplets.

28. An apparatus according to claim 27 further comprising a second jet operatively connected to said dispenser positioning means and said processor, and wherein said second jet is aligned to have a common target position with the first jet.

29. An apparatus according to claim 24 wherein the first and second layers are immediately adjacent one another.

30. An apparatus according to claim 24 wherein said dispenser positioning means comprises means for relatively positioning said dispenser along three directions and rotating said dispenser about two axes with respect to said platform thereby defining five degrees of freedom of movement for said dispenser relative to said platform.

31. An apparatus for making a three-dimensional article based upon article defining data, the article including diverging first and second contiguous wall portions defining an over corner, said apparatus comprising:

a platform;

a build material dispenser positioned adjacent said platform for dispensing build material in a plurality of droplets;

dispenser positioning means for advancing said dispenser along a predetermined path of travel with respect to said platform; and a processor for controlling said dispenser and said dispenser positioning means to construct the article in successive layers based upon the article defining data, said processor comprising over corner forming means for constructing the over corner in successive layers each of first and second segments corresponding to the first and second wall portions and while providing respective corner points by at least one drop of build material dispensed from said dispenser along an axis defined by successive corner points at the over corner.

32. An apparatus according to claim 31 wherein said processor further comprises burst control means for operating said dispenser to dispense a series of bursts of build material toward a series of respective target positions as said dispenser is advanced along the predetermined path of travel, each burst being defined by a plurality of droplets dispensed in relatively rapid succession so that the build material thereof combines at a respective target position.

33. An apparatus according to claim 31 wherein said processor further comprises gap control means for maintaining a predetermined gap between said dispenser and each target position so that a plurality of droplets join in traveling between said dispenser and a respective target position.

34. An apparatus according to claim 31 wherein said dispenser comprises a jet for ejecting the build material in a plurality of droplets.

35. An apparatus according to claim 34 further comprising a second jet operatively connected to said dispenser positioning means and said processor, and wherein said second jet is aligned to have a common target position with the first jet.

36. An apparatus according to claim 31 wherein the first and second layers are immediately adjacent one another.

37. An apparatus according to claim 31 wherein said dispenser positioning means comprises means for relatively positioning said dispenser along three directions and rotating said dispenser about two axes with respect to said platform thereby defining five degrees of freedom of movement for said dispenser relative to said platform.

38. An apparatus for making a three-dimensional article based upon article defining data, said apparatus comprising:
   a platform;
   a plurality of build material jets positioned adjacent said platform for ejecting build material in a plurality of droplets, said plurality of jets being directed to have a common target position;
   jet positioning means for advancing said plurality of jets along a predetermined path of travel with respect to said platform, said jet positioning means comprising means for relatively positioning said plurality of jets along three directions and rotating said plurality of jets about two axes with respect to said platform thereby defining five degrees of freedom of movement for said plurality of jets relative to said platform; and
   a processor for controlling said plurality of jets and said jet positioning means to construct the article based upon the article defining data, said processor comprising control means for operating said plurality of jets to eject respective droplets substantially simultaneously from said plurality of jets.

39. An apparatus according to claim 38 wherein said processor further comprises burst control means for operating each of said plurality of jets to eject a series of bursts of build material at a series of respective target positions as said plurality of jets is advanced along the predetermined path of travel, and wherein each burst is defined by a plurality of droplets.

40. A method for making a three-dimensional article based upon article defining data using an apparatus of a type including a platform, and a build material dispenser positioned adjacent the platform for dispensing build material in a plurality of droplets, said method comprising the steps of:
   advancing the dispenser along a predetermined path of travel with respect to the platform; and
   operating the dispenser to dispense a series of bursts of build material at a series of respective target positions to construct a continuous portion of the article as the dispenser is continuously advanced along the predetermined path of travel to thereby construct the article based upon the article defining data, each burst being defined by a plurality of successive droplets dispensed in relatively rapid succession to each other as compared to a last droplet in one burst and an initial droplet in a next succeeding burst so that the build material of the plurality of successive droplets of a burst combines at a respective target position.

41. A method according to claim 40 wherein the step of operating the dispenser comprises maintaining a predetermined gap between said dispenser and each target position so that a the plurality of droplets join in traveling between the dispenser and a target position.

42. A method according to claim 40 wherein the step of operating the dispenser further comprises operating the dispenser to dispense each burst with a predetermined spacing from adjacent bursts.

43. A method according to claim 40 wherein the step of advancing the dispenser comprises advancing the dispenser along the predetermined path of travel at a desired speed, and wherein the step of operating the dispenser further comprises operating the dispenser to dispense each burst with a predetermined number of droplets based upon the desired speed to thereby construct a layer of build material with a relatively uniform thickness.

44. A method according to claim 40 wherein the step of operating the dispenser further comprises operating the dispenser to dispense predetermined ones of the series of bursts defined by a different number of droplets at respective target positions than at other target positions along the predetermined path of travel.

45. A method according to claim 40 wherein the dispenser is a jet having a maximum stable excitation frequency, and wherein the step of operating the dispenser comprises operating the jet to dispense each burst with a plurality of droplets corresponding to the maximum stable excitation frequency of the jet.

46. A method according to claim 40 wherein the three-dimensional article includes first and second contiguous wall portions defining a corner, and further comprising the step of constructing the corner in successive layers each of first and second segments corresponding to the first and second wall portions so that respective corner points are provided by the first segment in a first layer and by the second segment in a second layer.

47. A method according to claim 46 wherein the first and second layers are immediately adjacent one another.

48. A method according to claim 40 wherein the step of advancing the dispenser comprises relatively positioning the dispenser along three directions and rotating the dispenser about two axes with respect to the platform thereby defining five degrees of freedom of movement for the dispenser relative to the platform.

49. A method according to claim 40 wherein the three-dimensional article includes first and second contiguous diverging wall portions defining an over corner, and further comprising the step of constructing the over corner in successive layers each of first and second segments corresponding to the first and second wall portions and while providing respective corner points by at least one burst of build material fired from the dispenser along an axis defined by successive corner points at the over corner.

50. A method according to claim 40 further comprising the steps of:
   determining an empty volume defined by wall portions of the article; and
   operating the dispenser to dispense a predetermined number of droplets to thereby fill the empty volume.

51. A method for making a three-dimensional article based upon article defining data using an apparatus of a type including a platform, and a build material dispenser positioned adjacent the platform for dispensing build material in a plurality of droplets, the article including first and second contiguous wall portions defining a corner, said method comprising the steps of:
   advancing the dispenser along a predetermined path of travel with respect to the platform;
   operating the dispenser to construct the article in successive layers based upon the article defining data; and
   constructing the corner in successive layers each of first and second segments corresponding to the first and second wall portions so that respective corner points are provided by the first segment in a first layer and by the second segment in a second layer.

52. A method according to claim 51 wherein the step of operating the dispenser further comprises operating the dispenser to dispense a series of bursts of build material toward a series of respective target positions as the dispenser is advanced along the predetermined path of travel, each burst being defined by a plurality of droplets dispensed in relatively rapid succession so that the build material thereof combines at a respective target position.

53. A method for making a three-dimensional article based upon article defining data using an apparatus of a type including a platform, and a build material dispenser positioned adjacent the platform for dispensing build material in a plurality of droplets, the article including diverging first and second contiguous wall portions defining an over corner, said method comprising the steps of:

advancing the dispenser along a predetermined path of travel with respect to the platform;

operating the dispenser to construct the article in successive layers based upon the article defining data; and constructing the over corner in successive layers each of first and second segments corresponding to the first and second wall portions and while providing respective corner points by at least one drop of build material dispensed from the dispenser along an axis defined by successive corner points at the over corner.

54. A method according to claim 53 wherein the step of operating the dispenser further comprises operating the dispenser to dispense a series of bursts of build material toward a series of respective target positions as the dispenser is advanced along the predetermined path of travel, each burst being defined by a plurality of droplets dispensed in relatively rapid succession so that the build material thereof combines at a respective target position.

55. A method for making a three-dimensional article based upon article defining data using an apparatus of a type including a platform, a plurality of build material jets positioned adjacent the platform and aligned for ejecting build material in a plurality of respective droplets toward a common target position, and jet positioning means for relatively positioning the plurality of jets along three directions and rotating the plurality of jets about two axes with respect to the platform thereby defining five degrees of freedom of movement for the plurality of jets relative to the platform, said method comprising the steps of:

advancing the jets along a predetermined path of travel with respect to the platform and while positioning the jets along five degrees of freedom of movement relative to the platform; and operating the jets to eject respective droplets substantially simultaneously from the plurality of jets.

56. A method according to claim 55 wherein the step of operating each of the jets comprises operating each of the jets to eject a series of bursts of build material at a series of respective target positions as the plurality of jets is advanced along the predetermined path of travel, and wherein each burst is defined by a plurality of droplets.

57. An apparatus for making a three-dimensional article including first and second contiguous wall portions defining a corner based upon article defining data, said apparatus comprising:

a platform;

a build material dispenser positioned adjacent said platform for dispensing build material in a plurality of droplets;

dispenser positioning means for advancing said dispenser along a predetermined path of travel with respect to said platform; and a processor for controlling said dispenser and said dispenser positioning means to construct the article based upon the article defining data, said processor comprising burst control means for operating said dispenser to dispense a series of bursts of build material toward a series of respective target positions as said dispenser is advanced along the predetermined path of travel, each burst being defined by a plurality of droplets dispensed in relatively rapid succession so that the build material thereof combines at a respective target position, and means for constructing the corner in successive layers each of first and second segments corresponding to the first and second wall portions so that respective corner points are provided by the first segment in a first layer and by the second segment in a second layer.

58. An apparatus for making a three-dimensional article based upon article defining data, said apparatus comprising:

a platform;

a build material dispenser positioned adjacent said platform for dispensing build material in a plurality of droplets;

dispenser positioning means for advancing said dispenser along a predetermined path of travel with respect to said platform, said dispenser positioning means comprising means for relatively positioning said dispenser along three directions and rotating said dispenser about two axes with respect to said platform thereby defining five degrees of freedom of movement for said dispenser relative to said platform; and a processor for controlling said dispenser and said dispenser positioning means to construct the article based upon the article defining data, said processor comprising burst control means for operating said dispenser to dispense a series of bursts of build material toward a series of respective target positions as said dispenser is advanced along the predetermined path of travel, each burst being defined by a plurality of droplets dispensed in relatively rapid succession so that the build material thereof combines at a respective target position.

59. An apparatus for making a three-dimensional article based upon article defining data, said apparatus comprising:

a platform;

a build material jet positioned adjacent said platform for dispensing build material in a plurality of droplets, said jet comprising a housing and a piezoelectric actuator positioned within said housing for dispensing the plurality of droplets of build material therefrom;

dispenser positioning means for advancing said dispenser along a predetermined path of travel with respect to said platform; and a processor for controlling said dispenser and said dispenser positioning means to construct the article based upon the article defining data, said processor comprising burst control means for operating said dispenser to dispense a series of bursts of build material toward a series of respective target positions as said dispenser is advanced along the predetermined path of travel, each burst being defined by a plurality of droplets dispensed in relatively rapid succession so that the build material thereof combines at a respective target position.

60. A method for making a three-dimensional article based upon article defining data using an apparatus of a type including a platform, a plurality of build material jets positioned adjacent the platform and aligned for ejecting build material in a plurality of respective droplets toward a common target position, and jet positioning means for relatively positioning the plurality of jets along three directions and rotating the plurality of jets about two axes with respect to the platform thereby defining five degrees of freedom of movement for the plurality of jets relative to the platform, said method comprising the steps of:

advancing the jets along a predetermined path of travel with respect to the platform and while positioning the jets along five degrees of freedom of movement relative to the platform; and operating the dispenser to dispense a series of bursts of build material at a series of respective target positions as the dispenser is advanced along the predetermined path of travel to thereby construct the article based upon the article defining data, each burst being defined by a plurality of droplets dispensed in relatively rapid succession so that the build material thereof combines at a respective target position.

* * * * *